May 25, 1954  T. HIMBERGER  2,679,082
TIGHTENER FOR CLOTHESLINES
Filed Nov. 17, 1952
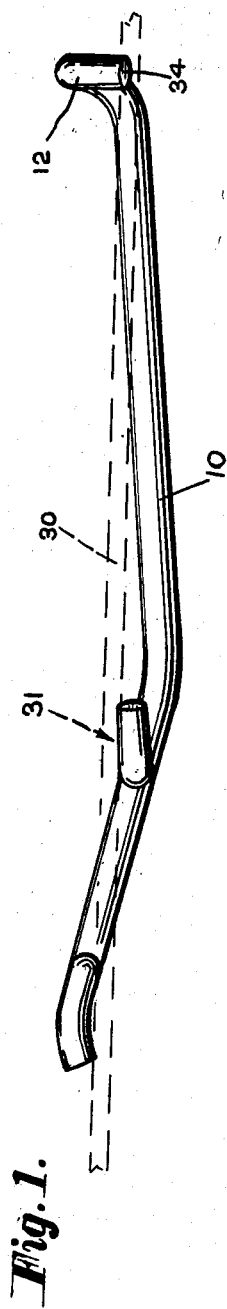
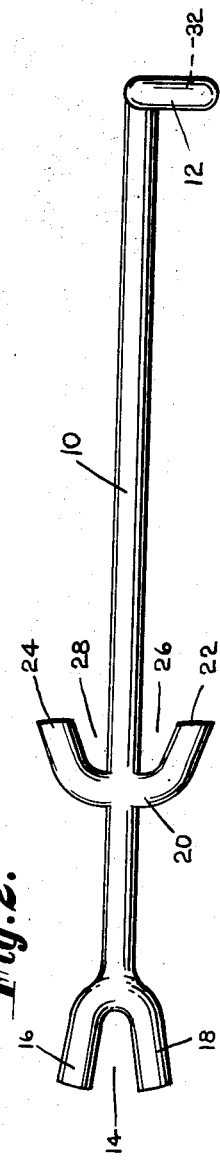
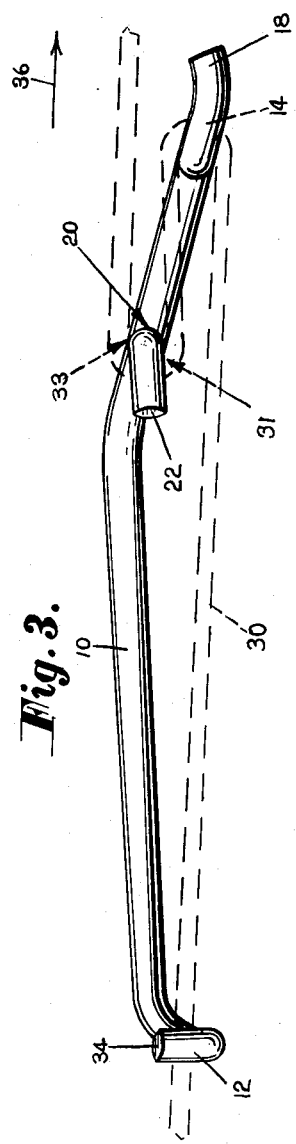
*INVENTOR.*
THEODORE HIMBERGER
BY *Arthur H. Sturges*
*Attorney*

Patented May 25, 1954

2,679,082

UNITED STATES PATENT OFFICE 2,679,082

TIGHTENER FOR CLOTHESLINES

Theodore Himberger, Omaha, Nebr.

Application November 17, 1952, Serial No. 320,975

1 Claim. (Cl. 24—71.3)

The instant invention relates to the art of drying laundered clothing, bedding, sheets and the like.

It is an object of the invention to provide a device of economical construction which may be readily manually actuated when attached to a clothes-line suspended horizontally above the soil during a drying of laundry suspended from said line and in a manner whereby the said line may be made taut or slack as may be desired.

A further object of the invention is to provide a device for the above described purposes which is so constructed that at times when heavy, wet garments, bedding or the like is suspended therefrom during drying operations that the lower portions of said garments may be readily prevented from contact with the soil and without an employment of clothes-line props or similar extraneous means.

Other and further objects and advantages of the invention will be understood from the following detailed description thereof.

In the drawings:

Figure 1 is a side view of a preferred embodiment of the instant invention attached in a position of use to a clothes-line, the latter being represented fragmentarily and by means of broken lines.

Figure 2 is a top plan view of the new device.

Figure 3 is a side view thereof and depicting the new device turned end over end with respect to the showing thereof in Figure 1, said clothes-line being provided with a loop.

Referring now to the drawing for a more particular description in which like numerals of reference designate like or corresponding parts throughout the several views:

10 indicates the elongated bar or shank portion of the new device. The bar is provided with a long end and a short end and the ends are positioned at a relatively wide angle. At one end of the long shank, the latter is provided with a transversely disposed hook 12. The hook, as best shown in Figure 2 is disposed to one side of the shank and at an approximate right angle with respect thereto.

The other end of the shank 10 is bifurcated providing a fork with an opening 14 between the oppositely disposed bifurcations or fingers 16 and 18.

Between the ends of the shank and preferably adjacent to the bifurcated end of the shank, a cross-arm 20 is provided.

The cross-arm is crescent-shaped in plan, the oppositely disposed terminal end portions 22 and 24 being in the form of wings and respectively extended away from the shank 10, whereby oppositely disposed like notches 26 and 28 are provided between the adjacent sides of the shank 10 and the terminal end portions 22 and 24 respectively of the cross-arm 20.

The transverse width of the notches 26 and 28 and the opening 14 are substantially equivalent to the diameter of the clothes-line 30. It will also be understood that the space indicated at 32 between the terminal end portion 34 of the hook 12 and adjacent side of the shank 10 is also approximately equal to the transverse diameter of said clothes-line 30 for a reception of said line in said space 32 at desired times.

The new device may be formed of plastic if desired and of variegated colors. Also, if desired, the new device may be formed of a single integral casting. Also if desired, the cross-arm 20 may be welded or otherwise suitably secured to the shank 10 and at times when the new device is made of ferrous metal.

Operation

Assuming that the oppositely disposed ends of the clothes-line 30 are secured to vertically disposed standards for supporting the clothes-line horizontally and that a given amount of laundry is suspended from the clothes-line in a conventional manner whereby the medial portion of the line sags downwardly towards the soil in a manner whereby debris, soil or the like would become attached to said laundry, garments or the like, the said line is made taut for causing the lower end portions of said laundry to be disposed upwardly away from the soil in a manner now to be described.

The new device may be applied to any portion of the longitudinal length of the line 30 selected by the operator, and assuming that the new device is in the position shown in Figure 1 with respect to the clothes-line 30, and that the hook 12 is not applied to said line initially and further assuming that a portion of said line is disposed through the opening 14 and in engagement with the cross-arm 20 and the notch indicated at 26, the operator then pushes upwardly on the hook 12 causing it to be swung 180 degrees counterclockwise, whereby the hook is moved from its initial position shown in Figure 1 to its up-side-down position shown in Figure 3.

During said swinging movement the portion 31 of the line 30 is caused to define a loop 33 thereby decreasing the length of the clothes-line for removing slack therefrom.

The hook 12 is now caused to engage the line 30 as shown in Figure 3 for maintaining a taut condition of said line.

The length of the shank 10 between the cross-arm 20 and the hook 12 may be any selected length for providing sufficient leverage for consummating the above described operation readily and without undue pressure applied by the operator.

As shown in Figure 3, the loop 33 is disposed above the main body portion 30 of the line, since the shank portion 10 is bowed or arcuate in side elevation for causing the loop to be so disposed, whereby a stress is applied to the line in the direction of the arrow 36 and since said loop is above the main body portion of the line 30, said stress causes the engagement of the line with the hook 12 to be maintained.

Assuming that one loop 33 is insufficient for removing the slack from the line the operator then, in such case, causes the hook end of the shank 10 to define a complete circle of 360 degrees after causing a disengagement of the hook 12 from the line. During said complete circular movement the line is caused to engage with the cross-arm 20 and within the notch 28 whereby a second loop is provided, said second loop not being shown. After the second loop is provided and the line consequently made tighter, the hook 12 is then reengaged with the line 30 and in the relative position of the parts shown in Figure 3.

From the foregoing description it is thought to be obvious that a tightener for a clothes-line constructed in accordance with my invention, is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

In a clothes line tightener, the combination which comprises an elongated bar straight in plan and having end sections positioned at a wide angle in elevation, the vertex of said angle being located between a point midway of the length of the bar and one end thereof providing short and long end sections, said short end section having an end portion arcuate in elevation and bifurcated in plan with outwardly diverging fingers providing a fork, said fingers being equally spaced from a plane on the longitudinal axis of the bar, said short end section also having a cross-arm with terminal end portions in the form of wings thereon and positioned between the fork and intersection of the short and long end sections, said wings being extended toward the opposite end of the bar from that on which the fork is positioned, and the extended end of the long end section of the bar having a transversely positioned hook thereon whereby with a clothes-line looped through one of said wings and extended through the fork the hook retains the tightener in position on the clothes-line.

References Cited in the file of this patent

UNITED STATES PATENTS

| Number | Name | Date |
|---|---|---|
| 1,472,167 | Grimme | Oct. 30, 1923 |
| 1,725,130 | Ciferskor | Aug. 20, 1929 |